(12) United States Patent
Dao et al.

(10) Patent No.: US 11,726,638 B1
(45) Date of Patent: Aug. 15, 2023

(54) SHAREABLE CUSTOMIZED IMAGE ASSOCIATED WITH AN ITEM

(71) Applicant: Amazon Technologies, Inc., Seattle, WA (US)

(72) Inventors: Hung Hoang Dao, Bellevue, WA (US); Hassan Munir Adwan, Woodinville, WA (US); Shruti Rajagopalan, Seattle, WA (US); Yazan Mahmoud Alrawashdeh, Shoreline County, WA (US); Tha'Er Mahmoud Albatayneh, Bothell, WA (US)

(73) Assignee: Amazon Technologies Inc., Seattle, WA (US)

( * ) Notice: Subject to any disclaimer, the term of this patent is extended or adjusted under 35 U.S.C. 154(b) by 0 days.

(21) Appl. No.: 18/059,316

(22) Filed: Nov. 28, 2022

(51) Int. Cl.
- *G06F 3/04845* (2022.01)
- *G06F 3/0482* (2013.01)
- *H04L 51/063* (2022.01)
- *H04L 51/52* (2022.01)

(52) U.S. Cl.
CPC ........ *G06F 3/0482* (2013.01); *G06F 3/04845* (2013.01); *H04L 51/063* (2013.01); *H04L 51/52* (2022.05)

(58) Field of Classification Search
CPC .... G06F 3/04845; H04L 51/52; H04L 51/063
See application file for complete search history.

(56) References Cited

U.S. PATENT DOCUMENTS

| | | | | |
|---|---|---|---|---|
| 10,282,056 | B2* | 5/2019 | Wei | G06F 3/04842 |
| 11,270,067 | B1* | 3/2022 | Paul | G06F 9/451 |
| 2005/0204309 | A1* | 9/2005 | Szeto | G06F 3/0482 |
| | | | | 715/861 |
| 2013/0314214 | A1* | 11/2013 | Leica | H04W 4/80 |
| | | | | 340/10.1 |
| 2013/0316647 | A1* | 11/2013 | Leica | H04B 5/0056 |
| | | | | 455/41.1 |
| 2014/0323142 | A1* | 10/2014 | Rodriguez | G06F 3/04847 |
| | | | | 718/104 |
| 2015/0145671 | A1* | 5/2015 | Cohen | G06Q 30/0241 |
| | | | | 340/539.11 |
| 2015/0161257 | A1* | 6/2015 | Shivaswamy | G06F 16/951 |
| | | | | 707/709 |
| 2016/0124924 | A1* | 5/2016 | Greenberg | G06F 3/1415 |
| | | | | 715/738 |
| 2018/0343336 | A1* | 11/2018 | Oh | H04M 1/72439 |

* cited by examiner

*Primary Examiner* — Andrea C Leggett
(74) *Attorney, Agent, or Firm* — Knobbe Martens Olson & Bear LLP

(57) ABSTRACT

Systems and methods are provided for presenting a user interface with options to customize content associated with an item and share the customized content associated with the item. When a sender customizes content associated with the item, a custom image may be generated based on the customization and associated with a landing page. The custom image and landing page may be associated with a custom rich content tag, where the custom rich content tag is associated with a custom URI. The custom URI may be shared with individual recipients or via a third-party messaging or social media service, such that the custom image may be shown in a message or post that includes the custom URI. Upon engaging with the custom URI, the landing page may be presented.

20 Claims, 7 Drawing Sheets

Customize Shareable Rich Content

SHAREABLE CUSTOMIZED IMAGE ASSOCIATED WITH AN ITEM

BACKGROUND

Currently, a uniform resource identifier (URI) directed to a webpage may be shared with a default image and preview text, where the default image/text can be rendered on a third-party service (e.g., social media sites) after the URI is shared. The URIs may contain or reference rich content tags (e.g., an Open Graph Tag) where the rich content tag is associated with an image, a preview text, and a landing page. However, sharing of the URI associated with a rich content tag does not typically grant control to the sharing user regarding how the shared URI or page will be previewed to a recipient user, and what is shown to the recipient or viewer is typically at the behest of the producer of the shared page.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Generally described, aspects of the present disclosure relate to presenting a user interface which allows a sender (e.g., a user who wishes to send or share an item or its associated page with one or more other receiving users) to customize a presentation of an item to be shared from the sender to a receiver. The user interface may be generated by a front-end server and cause a customer user device of the sender to display the user interface. The user interface may cause presentation of customization options based at least in part on properties of the item, or properties and/or settings of a sender, among other things. The sender may customize presentation of the item, for example, adding quotes to books, altering an image associated with an item, or selecting what product details should appear when the shared item is initially previewed to the recipient prior to the recipient selecting to view a full page regarding the item.

Based on the customizations that the sender selected, the front-end server may, through an item sharing service and image generator service, generate additional images and text. For example, custom image(s) and text may be generated based on the above customizations by the sender. The custom image(s) and text may then be stored to be referenced and shared via a sharing mechanism. Additionally, the stored custom image(s) and text may then be associated with a rich content tag. The rich content may be further associated with a landing page associated with the item, where the landing page may contain the custom image(s) and text or default image(s) associated with the item. Moreover, the rich content tag may then be associated with a custom URI where such URI may be shared via one or more sharing mechanisms (e.g., a text message, a social media post, etc.).

The front-end server may then share the custom URI to another computer user device (receiver) or even a third-party service (e.g., social media service). The third-party service or receiver device may utilize the URI to cause presentation of the custom image(s) associated with the item and also direct receivers to a landing page upon a user selection of the shared URI or an associated image or text (e.g., an image or text loaded via a rich content tag associated with the URI). For example, a computing device of the receiver may cause display of the custom image(s) directly on her computing device after receiving instructions from the front-end server. As another example, the third-party service may cause presentation of the custom image(s) in a social media post after receiving instructions from the front-end server. In causing presentation of the custom image(s) and text associated with the item, the URI may have been used to obtain the location of the custom image(s) and text via a rich content tag. In other words, the rich content tag may indicate the actual location of the custom image(s) and text. Receivers (including social media post viewers), may then interact with the custom image(s) (select by clicking, highlighting, etc.) and be brought to a custom or default landing page associated with the item. In being brought to a landing page associated with the item, the custom URI may have been utilized to retrieve the landing page associated with the item via the rich content tag. In the landing page, receivers may then view further details associated with the item and may also be allowed to perform different functions associated with the item, for example, purchasing the item or even the sharing the item themselves.

Figure 1:
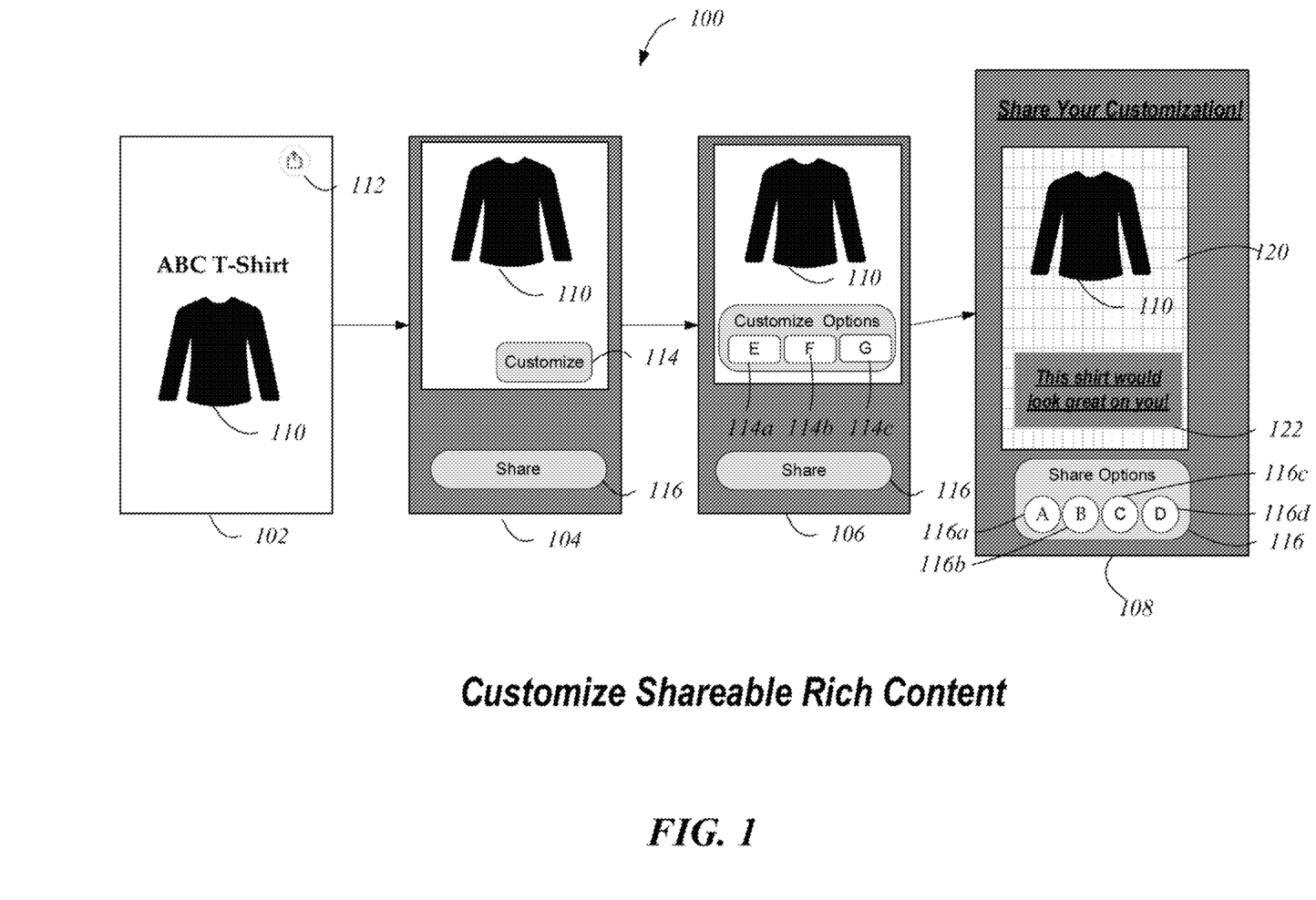
FIG. 1 depicts user interfaces showing a high-level example of sharing a custom presentation of an item.

Various aspects of the disclosure will now be described with regard to certain examples and embodiments, which are intended to illustrate but not limit the disclosure. Although aspects of some embodiments described in the disclosure will focus, for the purpose of illustration, on particular examples of user interfaces, servers, services, and/or devices, the examples are illustrative only and are not intended to be limiting. In some embodiments, the techniques described herein may be applied to additional or alternative user interfaces, servers, services, and/or devices, and the like. Any feature used in any embodiment described herein may be used in any combination with any other feature, without limitation FIG. 1 depicts an overview of user interfaces 100, specifically example user interfaces 102, 104, 106, and 108. Additionally, the user interfaces 100 further include an item 110, a share link 112, customize option 114, particular customize options 114a-c, share option 116, particular share options 116a-d, background 120, and comment 122. The user interfaces 100 may be presented by a user computing device, such as a desktop computer, laptop computer, mobile device (such as a mobile phone or tablet device) or other personal computing device. Accordingly, references herein are not limited to certain types and/or forms of user interfaces, such as, for example, a webpage, and are instead intended to broadly refer to a set of content presented together within a user interface of a browser or other software application. In some embodiments, portions of the user interfaces 100 may be generated by a server (e.g., a front-end server) or other remote system and sent over a network to the user's computing device for display.

As shown, user interface 102 presents an example item 110, here a t-shirt (though such user interfaces are not limited to t-shirts or other garments as the item type), and a share link 112. A user (also referred to as "sender") of the user computing device viewing the user interface 102 may view the item 110 and decide to share information (e.g., to another user ("receiver") or as a post on a third-party service) about item 110 by selecting the share link 112. The sender may engage the share link 112 clicking in (e.g., moving a cursor to, and clicking a mouse button), tapping (on a touchscreen device) or otherwise selecting the share link 112. Once share link 112 is selected, user interface 104 may present a customize option 114 to make customizations to a shareable presentation of item 110 prior to sharing item 110. It should be noted that item 110 is not being modified itself, but rather what is modified is how other users view presentation of item 110 (e.g., custom image(s), video, and/or audio associated with the item) during a preview of item 110. As described, once selecting customize option 114, the sender may utilize customization options to alter the presentation of item 110 prior to sharing item 110 with a receiver or even broadcast on a third-party service (e.g., social media post). Further, user interface 104 may contain a share option 116 which would allow the sender to share item 110 after customization or even without any customization. For example, if the sender selects customizations and then selects share option 116, the sender may send a customized presentation of item 110. As another example, if the sender doesn't select customizations prior to sharing item 110, the sender may send a default presentation of item 110 via a default product page showcasing the item without any changes but containing other information such as, but not limited to, weight, quantity, color, material, among other things.

As shown, user interface 106 presents item 110, particular customize options 114a, 114b, 114c, and share option 116. Customize options 114a, 114b, and 114c are represented as options lettered E, F, and G, respectively. Options E, F, and G are intended to convey different non-limiting options of customizations for the sender to choose from, in order to alter and/or change the presentation of item 110 when shared (but not the item itself). For example, option E may allow the sender to alter and/or change a default image associated with item 110 for presentation instead of showing a default image (e.g., allowing a virtual photograph to be generated where the sender is wearing item 110). Option F may allow the sender to add or remove product details concerning the item, such as brand, weight, color, and material instead of showing default product details. Lastly, option G may allow the sender to present alternative variations of item 110, for example, in a different color or material or even brand, instead of showing the current iteration of item 110.

As additionally shown in FIG. 1, user interface 108 presents item 110, particular share options 116a, 116b, 116c, 116d, background 120, and comment 122. Share options 116a, 116b, 116c, and 116d are represented as options lettered A, B, C, and D, respectively. Options A, B, C, and D are intended to convey different non-limiting options of sharing a custom presentation of item 110 or a default presentation of item 110. For example, share option A may allow the sender to share a customized presentation of item 110 through a text message on a phone or other similar mobile device. Share option B may allow the sender to share a customized presentation of item 110 via email or other electronic mail service. Share option C may allow the sender to share a customized presentation of item 110 via a messaging service. Finally, option D may allow the sender to share a customized presentation of item 110 via a third-party service.

As also shown in user interface 108, the sender may have customized item 110 to share it to receivers or via a third-party service post, or even through a text message. A shown, the sender may alter background 120 to have a background different from a default background, for example, from a white background to a background with a checkered pattern to highlight and/or showcase item 110 in a certain manner (custom to the sender's preference) prior to sharing item 110. Moreover, the sender may also customize the presentation of item 110 by adding text and/or a comment such as comment 122 at least allowing the sender to describe or highlight item 110 in her own words which may allow the sender to add more personalization to item 110 prior to sharing that would not otherwise have been allowed in an ordinary share setting.

As a result of sharing a customized presentation of item 110, other users (referred as a "receiver" or "receivers") may be able to experience the customized presentation of item 110. Moreover, the receivers may be able to interact with the customized presentation of item 110 in which such interaction may result in the receivers being directed to a destination page of item 110. The destination page of item 110 may allow the receivers to view additional information regarding the item 110 and potentially purchase the item or even allow the receivers to make their own customization of item 110 and share that customization with others (thereby becoming a sender themselves).

Figure 2A:
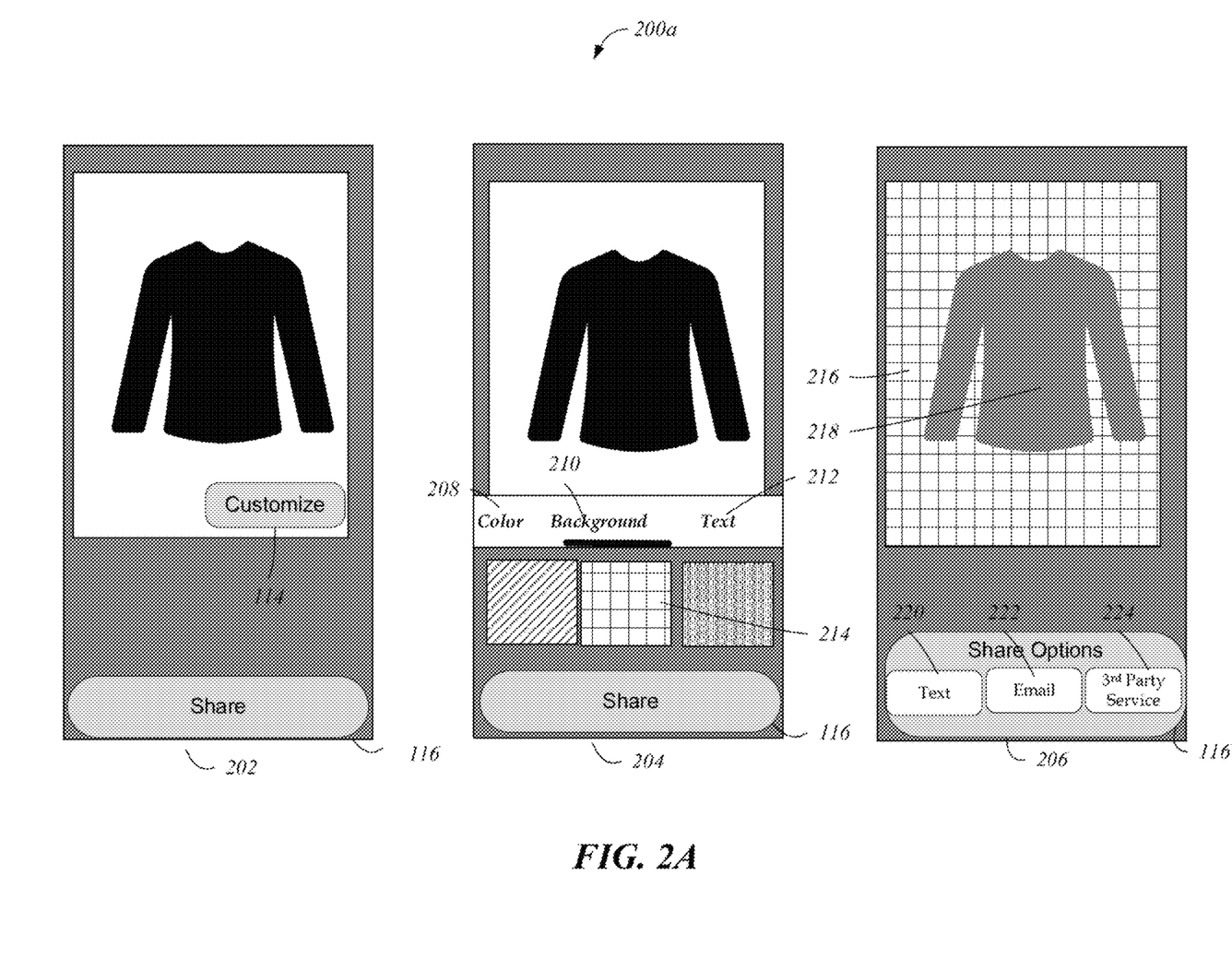
FIG. 2A depicts user interfaces showing an example embodiment of sharing a custom presentation of an item.

FIG. 2A depicts an example embodiment of sharing a customized presentation of an item via user interfaces 200a. User interfaces 200a include example user interfaces 202, 204, and 206. Additionally, the user interfaces 200a further include customize option 114, share option 116, customize option 208, customize option 210, customize option 212, background 216, shirt color 218, share option 220, share option 222, and share option 224. The user interfaces 200a may be presented by a user computing device, such as a desktop computer, laptop computer, mobile device (such as a mobile phone or tablet device) or other personal computing device. Accordingly, references herein are not limited to certain types and/or forms of user interfaces, such as, for example, a webpage, and are instead intended to broadly refer to a set of content presented together within a user interface of a browser or other software application. In some embodiments, portions of the user interfaces 200a may be generated by a server or other remote system and sent over a network to the user's computing device for display.

As shown, user interface 202 presents customize option 114 and share option 116 along with an item presented (in this case, a shirt). As stated above, customize option 114 allows a sender to customize a presentation of an item to be shared, but not customize the item itself (e.g., the underlying shirt item would be unchanged by customization selections made by the user, though a different image of the shirt may be selected and/or generated). Additionally, and also stated above, share option 116 allows a sender to share a customized presentation of an item or even share a default presentation of an item. Moreover, as shown in user interface 204, customization options 208, 210, 212, and 214 may be based at least on the item and also properties and/or preferences associated with a sender, allowing the sender to make customizations to how an item will be presented to a recipient of a sharing instance based on the item or the sender herself. For example, user interface 204 may allow a sender to modify the color of an item via customize option 208 because the item is determined to be a t-shirt that is offered in multiple colors and therefore a sender would be able to customize the color of the t-shirt to be shown to a recipient prior to sharing the t-shirt. As another example, customize option 210 may allow a sender to customize a background in an image depicting an item prior to sharing the item. As also shown in user interface 204, a sender may select customize option 214, thereby choosing a pattern of three available patterns as background image content in this example embodiment. A sender may also select customize option 212 to add text or writing that may be presented with the item to add personalization to the presentation of the item (such as to have text typed by the user be added into or overlaid on the image as pixel data). Additionally, once a sender has chosen, or not chosen, her customization options to present an item, she may select share option 116 to share presentation of an item as a customization or in default form.

As shown, user interface 206 presents background 216, item 218, and share options 220, 222 and 224. User interface 206 may be a result of customization options selected in user interface 204. Background 216 may be presented with the item 218 after a sender selected, while in user interface 204, to change a background of the item by selecting customize option 210 and then choosing a particular background 214 from the available background options. Additionally, user interface 206 may show the result of a sender selecting customize option 208 from user interface 204 showing the exact color that a sender chose to modify the look of the item, here, the color of item 218, which is a t-shirt. As another example, a sender may have selected customize option 210 from user interface 204 which results in a customized background for the item being shown in user interface 206 prior to sharing. For example, a sender may have selected customize option 214 from user interface 204 thereby choosing a pattern of three available patterns. As a result of choosing customize option 214, user interface 206 may present the background style of 214 as background 216 in user interface 206.

Still referring to FIG. 2A, once satisfied with customization options to alter the presentation of an item, the sender may select at least one of share option 220, share option 222, or share option 224 to share a customized presentation of item 218 via different sharing mechanisms. For example, the sender may select share option 220 to send the customized presentation of item 218 to a friend for an opinion via a text message. As another example, the sender may select option 222 in order to send the customized presentation of item 218 via email to a family member in order to suggest purchasing item 218. Additionally, the sender may select option 224 in order to post the customized presentation of item 218 to a third-party service such as a social media website, allowing other third-party users the ability to experience the customized presentation of item 218. As stated above, share options 220, 222, and 224 not only allow receivers to experience the customized presentation of an item but also allow them to interact with it, where that interaction may result in the receivers being directed to a destination page which allows purchase of item 218, presents information about item 218, or even allows the ability for the receivers to also share their own customized presentation of item 218.

Figure 2B:
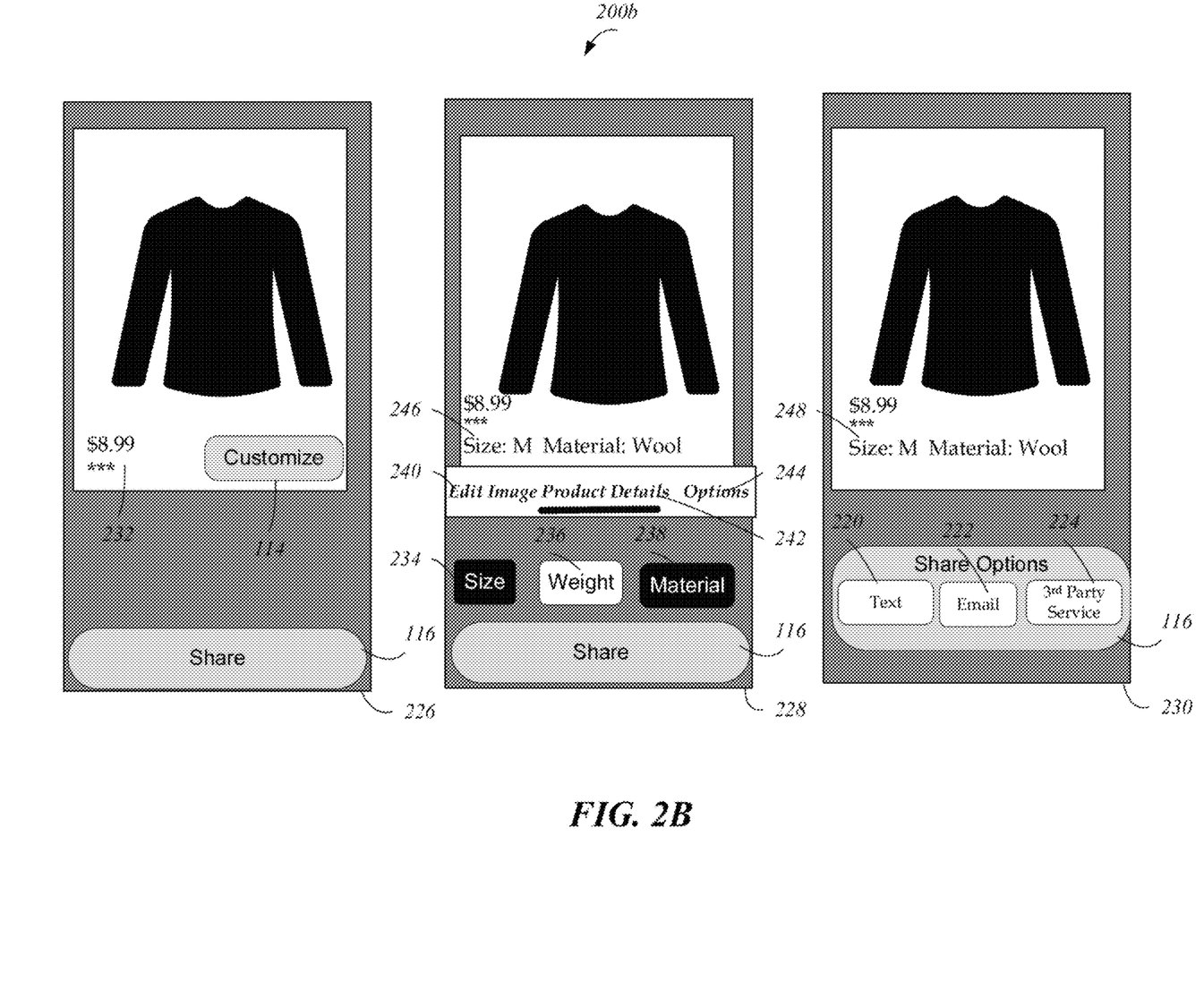
FIG. 2B depicts user interfaces showing an example embodiment of sharing a custom presentation of an item.

FIG. 2B depicts an additional example embodiment via user interfaces 200*b*. User interfaces 200*b* includes example user interfaces 226, 228, and 230. Additionally, the user interfaces 200*b* further include customize option 114, share option 116, item details 232, customize option 234, customize option 236, customize option 238, customize option 240, customize option 244, item details 246, item details 248, and share options 220, 222, and 224. Similar to the user interfaces 200*a*, the user interfaces 200*b* may be presented by a user computing device, such as a desktop computer, laptop computer, mobile device (such as a mobile phone or tablet device) or other personal computing device. Accordingly, references herein are not limited to certain types and/or forms of user interfaces, such as, for example, a webpage, and are instead intended to broadly refer to a set of content presented together within a user interface of a browser or other software application. In some embodiments, portions of the user interfaces 200*b* may be generated by a server or other remote system and sent over a network to the user's computing device for display.

As shown, user interface 226 presents customize option 114, a share option 116, and item details 232. Customize options 114 and share option 116 are explained above in FIG. 2A, therefore, no further explanation is required. Additionally, user interface 226 may additionally present item details 232. Item details 232 may present information about an item which may be shared via share option 116, for example, the price of the item and the item's star rating if available. Furthermore, as shown, user interface 228 presents various customization options and item details 246. In an example, by selecting customize option 242, concerning product details, a sender may customize presentation of an item by selecting, or not selecting, certain details about an item for presentation to receivers when sharing. More specifically, when selecting customize option 242, a sender may be allowed to interact with and/or select customize options 234, 236, or 238. As shown, customize option 234 may allow the sender to present a size of an item, for example, whether an item is a small, medium, or large t-shirt, to a recipient. Customize option 236 may allow the sender to present a weight of an item, for example, that a bag of dog food weighs ten pounds, to a recipient. Customize option 238 may allow the sender to present what kind of material(s) an item is made out of or contains, for example, presenting that a sweater is made up of wool, cashmere, and cotton.

Still referring to FIG. 2B, customize option 240 may allow a sender to modify and/or alter an image associated with an item. As an example, when selecting customize option 240, image editing tools may surface to the sender in order to edit an image associated with the item. The sender may then use these image editing tools to make alterations to a default image, such as, for example, superimposing an image of the sender with the item. For example, the sender may present a virtual try-on of the item, such as a sweater, where a default image is altered to show the sender virtually trying on the sweater as a virtual photograph. This altered image of the sender virtually trying on a sweater may be shared as a part of a customized presentation of an item (e.g., the underlying sweater item). Furthermore, customize option 244 may allow the sender to perform additional customizations to a presentation of an item for sharing that are not related to image altering or item details, such as allowing the sender to add text or quotes to an item that will be shared with receivers. For example, the sender may customize presentation of the item by associating a message (such as text content) with the item where the message tells the receiver how good the item would look on the receiver.

Still referring to FIG. 2B, once satisfied with customization options to alter the presentation of an item, in user interface 230, the sender may select at least one of share option 220, share option 222, or share option 224 to share customized details 248 about an item via different sharing mechanisms. As shown in user interface 230, the sender may preview a customized presentation of an item before sharing such customized presentation via the different sharing mechanisms described. Here, in this example, the sender has customized the presentation of a clothing item to share item details such as price of the item, star reviews of the item, size of the item, and the material that the item is made out of.

It should be noted that there are other embodiments not described in FIGS. 2A and 2B in which the sender may customize the presentation of an item, and that the features of those figures should not be seen as limiting. For example, the sender may not only share a customized presentation of an item but also use customization options related to an item to engage in interactive messaging with a receiver concerning the item. In other words, a share feature of an item may bring a sender of the presentation of an item and a receiver of the presentation of an item to a destination page where messages and icons between the sender and receiver are shown in this destination page. This type of interaction between the sender and receiver may allow either party to give comments and/or feedback regarding the item in question, which may help either party decide on purchasing the item or taking any other action regarding the item.

Figure 3:
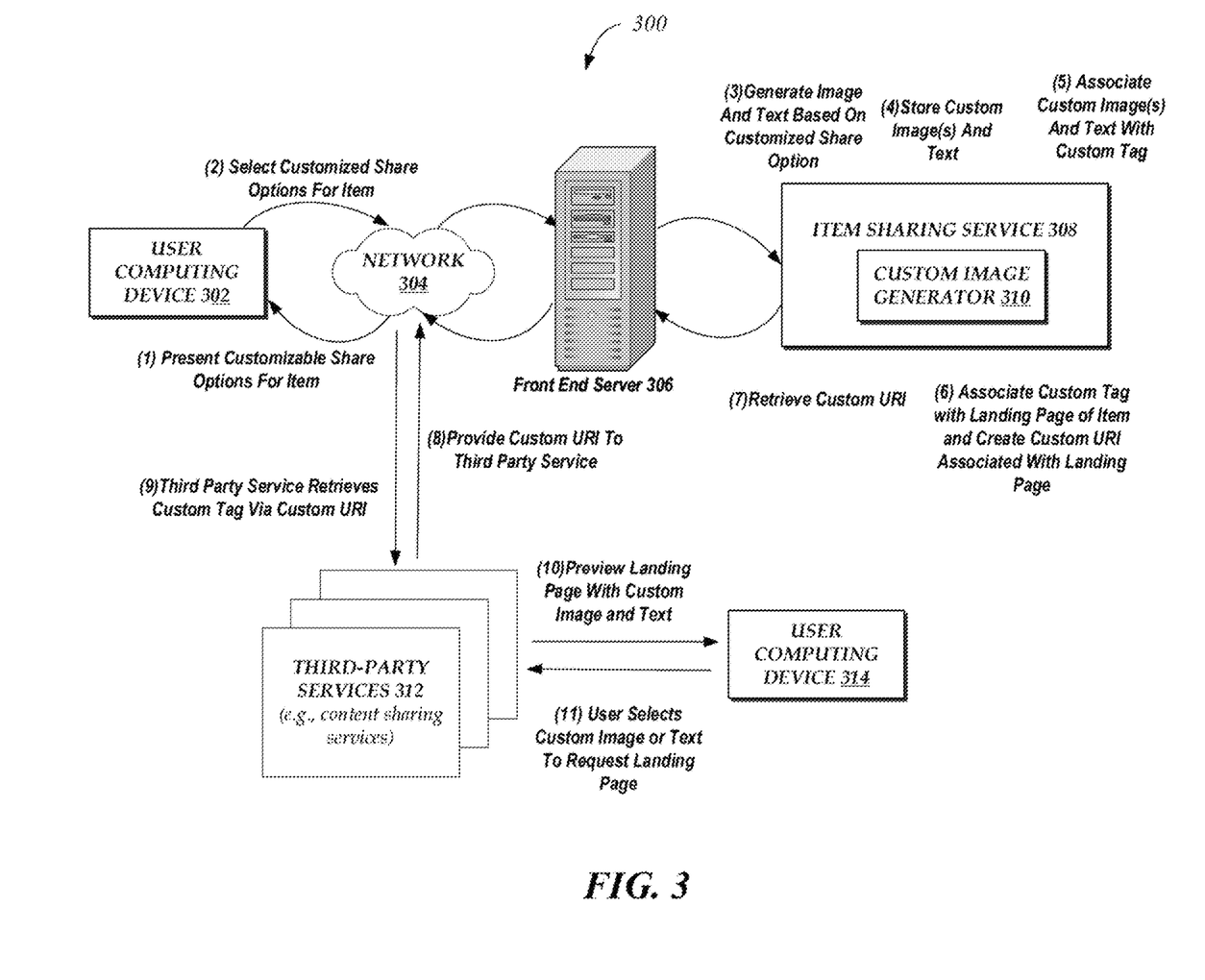
FIG. 3 is a block diagram and illustrative flow of data within an example operating environment for implementing aspects of the present disclosure, according to some embodiments.

FIG. 3 is a block diagram and illustrative flow of data within an example operating environment 300 for implementing aspects of the present disclosure, according to some embodiments. As shown, front end server 306, at step (1), may send instructions to present a user interface for customizing a presentation of an item to share, to a user computing device 302 via a network 304 (such as the Internet). Front end server 306 may determine, via item sharing service 308, customization options based on the type of item which a user of user computing device 302 (also referred to as "sender") is presented with. For example, item sharing service 308 may determine that the item for presentation is a book and therefore may instruct user computing device 302 to cause presentation of a customization user interface which allows selection of a quote from a book, be able to choose different covers for a book, and/or other options to customize presentation of a book item which may be shared to receivers. As explained in another example, item sharing service 308 may determine that the item for presentation is a food product and therefore may instruct user computing device 302 to cause presentation of a customization user interface which allows selection of certain product details such as size, weight, flavors, delivery options, and/or allow photo editing of the item and/or its background. In another example, item sharing service 308 may determine that the item for presentation is a clothing item and therefore may instruct user computing device 302 to cause presentation of a customization user interface which allows a virtual try-on of the clothing item by superimposing audio/visual content associated with a sender with the clothing item, the end result of the customized presentation being a virtual photograph of the sender wearing the clothing item, in one embodiment.

Next, at step (2) of FIG. 2, the sender may select customization options to customize presentation of an item to share with receivers (or share via a third-party service post) and may share those customization options with front end server 306 via network 304. As an example, if the item was a book, the sender may have selected a dark background, a quote from chapter 5 of the book, and changed the displayed cover of the book from a soft cover to a hard cover, among other customizations. As another example, if the item was a t-shirt, the sender may have selected the price, weight, color, material, product description, and star user ratings to share with another user. Still assuming the item was a t-shirt, the sender may try a virtual try-on customization which may result in a virtual photograph where the sender is wearing the t-shirt, and this virtual photograph is shareable. As a third example, the sender may select an option to create a custom messaging page which includes the item and page mechanics to show comments between the sender and receiver concerning the item, such as positive and/or negative feedback or even sharing emojis or other graphical feedback as a response to the item.

At step (3), the front-end server 306 may send instructions to, or work with, an item sharing service 308, in turn utilizing custom image generator 310, where image generator 310 may generate custom image(s) and optionally text based on the selected customization options from step (2). As described in more detail below, the custom image(s) and text may be shown to a receiver as a presentation of an item whether through a messaging service or via a social media post. At step (4) the item sharing service 308 may then store the custom image(s) and text to be retrieved at a later time, at least when there is a request for a customized presentation of an item.

At step (5), after storing the custom image(s) and text, item sharing service 308 may then associate the custom image(s) and text with a custom rich content tag, such as an Open Graph Tag. For example, the custom rich content tags may be added to the head section of HTML coding of a webpage's HTML, such that a messaging service (or third-party service) may retrieve the custom rich content tags by referencing the head section of a web page's HTML coding. Once referencing the custom rich content tags, the messaging/third-party service may retrieve the image(s) and text by accessing the location set by the rich content tags for the image(s) and text. Once the messaging service (or third-party service) retrieves the custom image(s) and text, such service may cause presentation of the custom image(s) and text to a receiver in order to share the sender's customized presentation of an item (e.g., showing a virtual photo with the sender wearing a t-shirt, where the t-shirt is the item).

As an alternative example, the rich content tags may be associated with a central clearinghouse for rich content tags and would therefore not need to be associated with a webpage's HTML head section but can be referenced by a third party going to the central clearinghouse and querying an identifier of a unique custom rich content tag. Therefore, alternatively, instead of going to a webpage's HTML coding head section, a messaging/third-party service may retrieve the custom image(s) and text to build a preview by referencing a clearinghouse or other repository with a unique custom rich content tag's identifier.

The custom rich content tag may also be associated with a dedicated custom, or default, landing page associated with the item. The landing page of an item may allow viewing and/or interaction with one or more details concerning the item, with or without the customized presentation options, and the landing page may also allow purchase of the item. The custom rich content tag may indicate that the custom image(s) and/or text are to be presented as a representation of an item and also allow those who interact with the custom rich content tag to be directed to the custom or default landing page associated with the item described above.

At step (6), after associating the custom rich content tag with the custom image(s) and text, item sharing service 308 may create a custom URI which may refer to the custom rich content tags (e.g., in the head section of HTML coding of a landing page of the item or via a central clearinghouse). The item sharing service 308 may then associate the custom rich content tag with the custom URI where the custom URI may be shared via a sharing mechanism chosen by the sender who selected customized share options (described in more detail below). As stated above, the custom rich content tag (with associated image(s) and text) may be placed by the item sharing service 308 in the head section of a webpage's (e.g., webpage may be a default or custom landing page of the item) HTML code/markup content. Additionally, the custom rich content tag may be alternatively associated with a central clearinghouse where a messaging or third-party service would retrieve custom rich content tag (and associated image(s) and text) via such central clearinghouse instead of referencing a webpage's HTML looking for rich content tags.

After associating the custom image(s) and text with the custom rich content tag, and then associating the custom rich content tag with a custom URI, item sharing service 308 may store the custom rich content tag and the custom URI in a data store associated with item sharing service 308. It should be noted that storage of the custom rich content tag and the custom URI are not meant to be limited to only storage via a data store and that the custom rich content tag and the custom URI may be stored via other computing mechanisms depending on other implementations. Moreover, the item sharing service 308 may retrieve the custom URI and/or the custom rich content tag depending on the type of request. For example, front end server 306 may request the custom URI to initially share the customized presentation of an item from step (2) to a third-party service (social media websites).

At step (7), via network 304, front end server 306 may provide the custom image(s) and text generated by custom image generator 310 to a third-party service 312 (e.g., social media platform) via the custom URI. As described above, when the custom URI is shared with an entity, for example, a third-party service or even to another user via a messaging service, the custom URI may be used by the third-party service 312 to determine the custom rich content tag wherein the custom rich content tag is associated with the custom image(s)/text and a landing page associated the item. As stated above, the custom rich content tag may be retrieved by using the custom URI to get a webpage's HTML head section or via a central clearing house that stores custom rich content tags.

At step (8), at the request of a sender, the front-end server 306 may share the custom URI with a third-party service such that the third-party service may present the custom image(s) and text as a preview for the item (e.g., by using the custom URI to access a webpage's HTML head section). For example, a user of the user computing device 302 may elect to share their customization at step (2) on a social media post via a third-party service after the custom image(s), custom text, and custom URI may have been generated by item share service 308. In other words, the user may share the customization by selecting share option 224 in FIG. 2A or 2B after customizing their share instance of an item. By selecting share option 224, the user may then select a third-party service to post their share instance. By selecting a third-party service to share the share instance of the user's customization, front end server 306 may retrieve the custom URI and send the custom URI to the selected third-party service via an application programming interface (API) and instruct the third-party service to place the custom URI in a social media post via the API, or any other type of third-party service post or message, at the behest of the user.

Moreover, the front-end server 304 may inform the third-party service that the custom URI points to a custom rich content tag to be displayed, for example, in an HTML coding head section of a webpage in which the URI refers to or in a central clearinghouse of rich content tags.

Still at step (8), as alternate example, the user may have selected share option 220 in FIG. 2A or 2B after customizing their share instance of an item. By selecting share option 220, the user may then select receiver(s) to share her customized share instance via a text message, or other phone messaging service. By selecting receiver(s) to share her share instance customization, front end server 306 may retrieve the custom URI and send the custom URI to the selected receiver(s) via their text application, or messaging service, and instruct such text applications or messaging services to place the custom URI in a text message via an API, or similar type of message, at the behest of the user. Moreover, the front end server 304 may inform a text messaging service via the API that the custom URI refers to a custom rich content tag to be displayed, for example, in an HTML coding head of a webpage in which the URI refers to or in a central clearinghouse of rich content tags.

At step (9), if the third-party service decides to present the customized options from step (2) as a customized presentation of an item via the custom image(s) and text, such third-party service may reference the custom URI (sent to it in step (8)) in order to retrieve the custom rich content tag (e.g., via an HTML head section) to cause the custom image(s) and text associated with the custom rich content tag to be displayed via the third-party service, for example, as a social media post. Therefore, in step (10) and in effect, viewers of a third-party post may see (prior to clicking through or otherwise following any link) the custom image(s) instead of default image(s) associated with the item. As stated above, the custom image(s) may reflect the customizations previously made by the sharing user via user computing device 302 at step (2).

At step (11), if a receiver interacts with the custom image(s) and text associated with the custom rich content tag via the third-party service (e.g., clicking on or otherwise selecting the post showing the custom image(s) associated with the item), such receiver may be directed to a landing page associated with the item, which the custom rich content tag refers to. As stated above, the landing page may be a default landing page showing the item details such as quantity and price, while allowing the receiver to purchase the item. In other embodiments, the landing page may be a custom landing page based off the selected customizations from step (2). For example, the landing page may present the custom image(s) and text instead of a default image associated with the item.

It should be noted that while the custom URI and the custom rich content tag are sent to a third-party service for presentation in FIG. 3, the custom URI and custom rich content tag may be shared via other sharing mechanisms. As such, the examples share mechanism shown in FIG. 3 are not meant to be limiting. For example, the custom URI and custom rich content tag may also be shared via a messaging service and displayed on a receiver's computing device via the messaging service, such as a rich text message displaying the custom image(s). As another example, the custom URI and custom rich content tag may be shared via email in order to display the custom image(s) through email as a representation of the item instead of default image(s).

Figure 4:
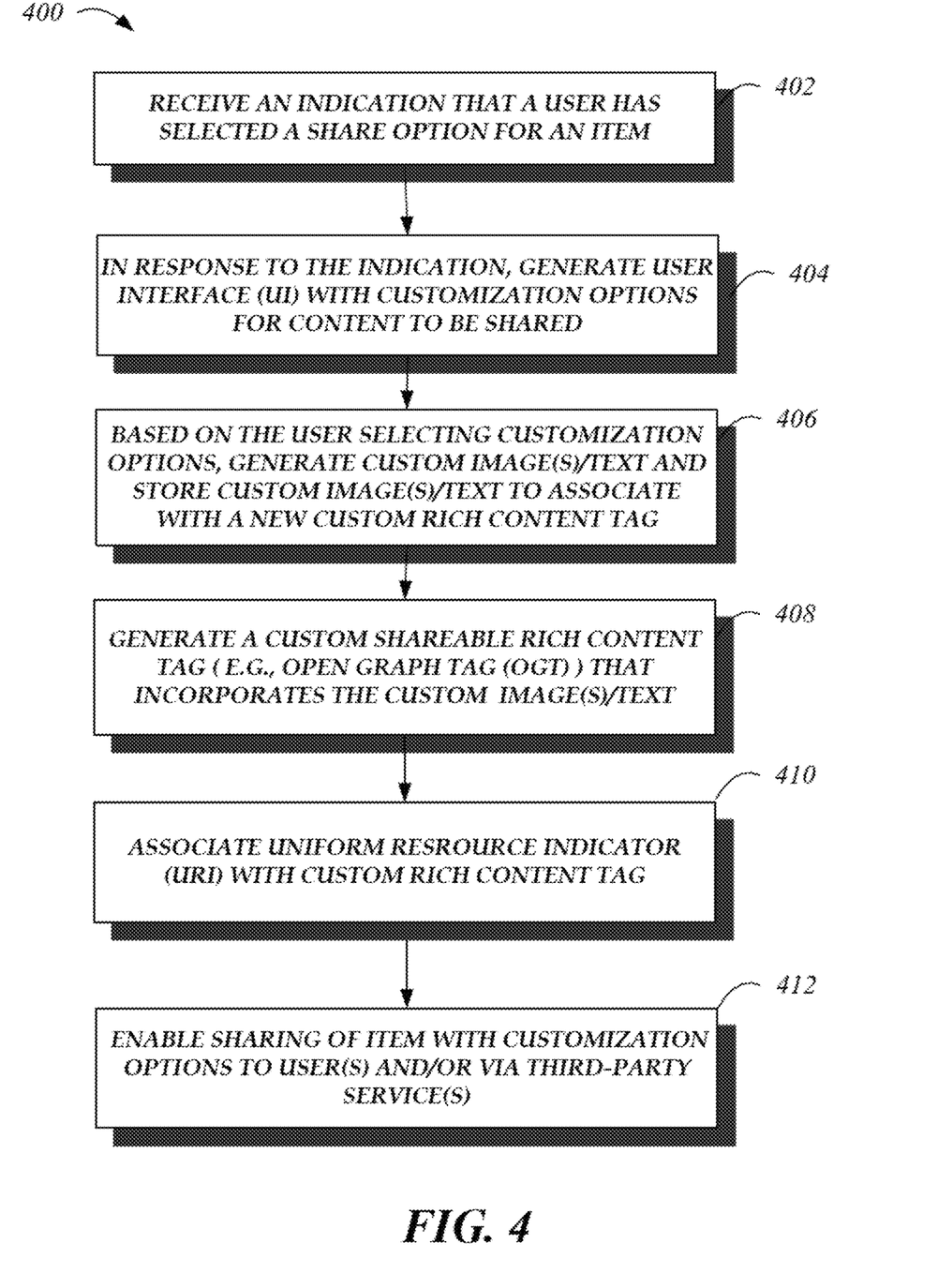
FIG. 4 is a flow diagram of an illustrative method for creating a custom presentation of an item based at least on input from a user.

FIG. 4 is a flow diagram of an illustrative method 400 for presenting a user interface to a sender in order to customize presentation of an item and then creating a custom URI and custom rich content tag. As stated above, the custom rich content tag may be associated with image(s) and text that are generated by the custom image generator 310 based at least in part on customization options that were selected by the sender as described in step (2) of FIG. 3. Depending on the embodiment, method 400 may be implemented by a user computing device or by a server remote from the user computing device that ultimately displays the user interface. In other embodiments, aspects of the method 400 may be performed by a user computing device (such as receiving indications of user input and causing a display of user interface data), while backend determinations of item presentation customizations and their formatting for presentation to the sender may be made by a server or other remote system that is in communication with the user computing device.

As an example embodiment, the method will be described below with reference to a user computing device performing some of the blocks of FIG. 4 and a front end server (and its related and/or subsidiary components) performing some of the blocks of FIG. 4. The functionality referenced in each of the blocks shown in FIG. 4 has generally been previously described with respect to other figures above, and will thus only be briefly summarized below in some instances. At block 402, a front-end server may receive, from a user computing device, an indication that a sender has selected a share option to share content concerning an item. As explained above, a selection of a share option of an item may be to share content about the item either via a third-party service (such as a social media service) or by the receiver via the receiver's user computing device (e.g., via a messaging application). In other words, and as another non-limiting example, a sender may be presented with an item webpage that displays certain content about an item (image(s), price, weight, color, etc.) and desires to share the item webpage with a receiver. In doing so, the sender may select a share option to share at least the item webpage with the receiver.

At block 404, the front-end server may, in response to the indication that the sender via their user computing device has selected the share option to share content concerning an item, generate a user interface (UI) with customization options for presentation of the item to a receiver. As stated above, the UI may create different customization options based on the type of item the sender has decided to share. For example, if the item is a book, the UI may present customization options which allow the sender to select a different cover for the book, to select a quote associated with the book, or choose a color of the background of the book. As another example, if the item is a piece of clothing, such as a t-shirt, the UI may present customization options which allow the sender to virtually try on the clothing and produce a virtual photograph of the user wearing the clothing item. As a third example, if the product is a food item, the UI may present customization options which allow the sender to select different product details concerning the item, such as weight, number of calories per serving, or quantity.

At block 406, based on the sender selecting customization options, the front end server may cause a custom image generator (e.g., custom image generator 310), via an item sharing service (e.g., item sharing service 308), to generate custom image(s) and optionally custom text, and store the custom image(s)/text to be associated with a new custom URI. As described above, the custom image(s)/text may be stored in a data store or other electronic means of storage in order to be retrieved at a later time.

At block 408, the item sharing service may generate a custom rich content tag (e.g., Open Graph Tag (OGT) or similar) that incorporates the custom image(s) and text created at block 406. As described above, when loaded via a URI (such as from within the head section of HTML data retrieved via the URI), the custom rich content tag may at least allow a third-party service to reference and display the custom image(s)/text and then allow interaction with the custom image(s)/text (e.g., clicking on a social media post), wherein the interaction with the custom image(s)/text causes a receiver who interacted with the custom image(s)/text to be directed to the destination page associated with the URI. As also described above, the destination page may display details concerning the item and an ability to purchase the item, along with the custom image(s) or even default image(s) associated with the item determined by the customization options the sender selected. At block 410, the item sharing service may then associate the custom rich content tag with a URI by adding the custom rich content tag to the HTML head coding section of HTML, which builds the landing page associated with the URI, or by having the URI point to a central clearinghouse where the custom rich content tag is centrally located. It will be appreciated that in some embodiments, the system may initially store an association between the custom rich content tag and a new custom URI to be shared (without generating a new HTML page), then may dynamically construct/assemble the HTML of the page to include the custom rich content tag when responding to a request for page content of the custom URI (e.g., from a later recipient of the custom URI selecting to load the custom URI for display via a browser application).

At block 412, the item sharing service may enable sharing of the item with customization options to user(s) and/or via third-party service(s). As described above, the custom URI and the custom rich content tag may be made publicly available to whomever a sender selects to send to, and in selecting the custom URI/custom rich content tag, a third-party service or receivers may display the custom image(s) (e.g., as a social media post) which were generated at least due to the sending user's selection of the customization options.

Figure 5:
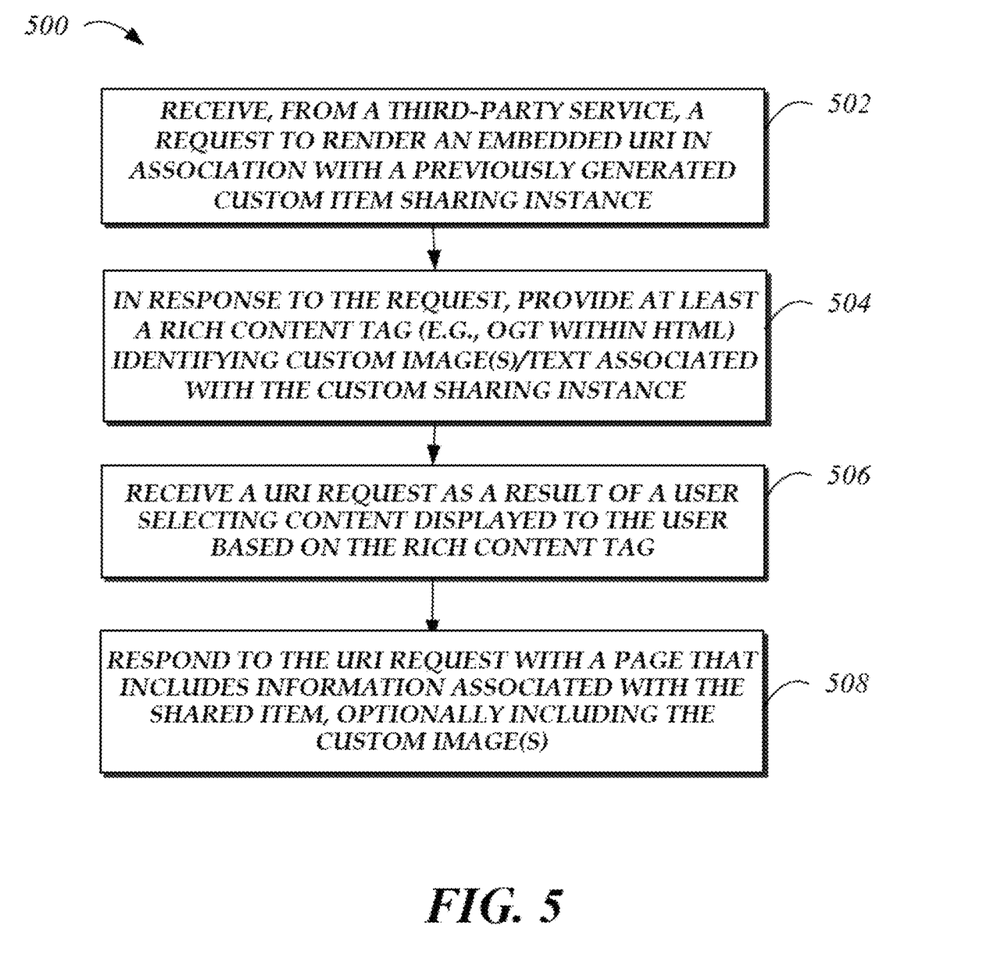
FIG. 5 is a flow diagram of an illustrative method for returning a page associated with an item at the request of a third-party service.

FIG. 5 is a flow diagram of an illustrative method 500 for receiving and responding to a request to render a page associated with an item via a custom sharing URI. As stated above, the page associated with the item may present details about the item and allow the item to be purchased via the page, in some embodiments.

At block 502, a front-end server may receive, from a third-party service, a request to return page content of a custom URI in association with a previously generated custom item sharing instance. A previously generated custom sharing instance may contain or be associated with a custom URI and a custom rich content tag. As stated above, the custom URI and custom rich content tag may be associated with custom image(s) and a landing page.

At block 504, in response to the request to render an embedded URI, the front-end server may provide at least a rich content tag (e.g., OGT) identifying custom image(s)/text associated with the custom sharing instance. As stated above, a third-party service may be configured to provide a preview of a landing page URI that is included in a post or message by interpreting any rich content tag returned via an initial request to the server hosting the landing page. The third-party service may use the custom URI to locate and get access to the custom rich content tag by accessing HTML content returned via the custom URI and then searching the HTML head section of the landing page, which contains the custom rich content tag. In other words, the custom URI may provide an address location of HTML used to build the landing page and the third-party service may use this address location to search the head section of HTML for rich content tags. Alternatively, the URI may provide a direct reference to a custom rich content tag where the third-party service can take such reference and search a central clearinghouse or other third-party repository for the custom rich content tag.

The third-party service, once locating the rich content tag, may parse and evaluate the rich content tag to obtain custom image(s)/text and display the custom image(s)/text associated with an item, for example, as a social media post. In other words, the custom rich content tag may provide an address location (e.g., image URI) of where a custom image is stored or can be referenced from, and may also contain custom text inline within an OGT or similar tag. Once obtaining this address location of the custom image(s) and also parsing text to be displayed from the rich content tag, the third-party service may directly retrieve the custom image(s). Once retrieving the custom image(s) and text, the third-party service may present the custom image(s) and text as a preview for the landing page of the item, for example, as in a social media post. This preview may be selected by the receiving user in order for the receiver's device (e.g., via a browser) to be directed to the landing page.

At block 506, the front-end server may receive a URI request as a result of a receiver selecting content displayed to the user based on the rich content tag and custom image(s) and text. The front-end server may respond to the URI request with a page that includes information associated with the shared item, and optionally includes the custom image(s) and text.

Figure 6:
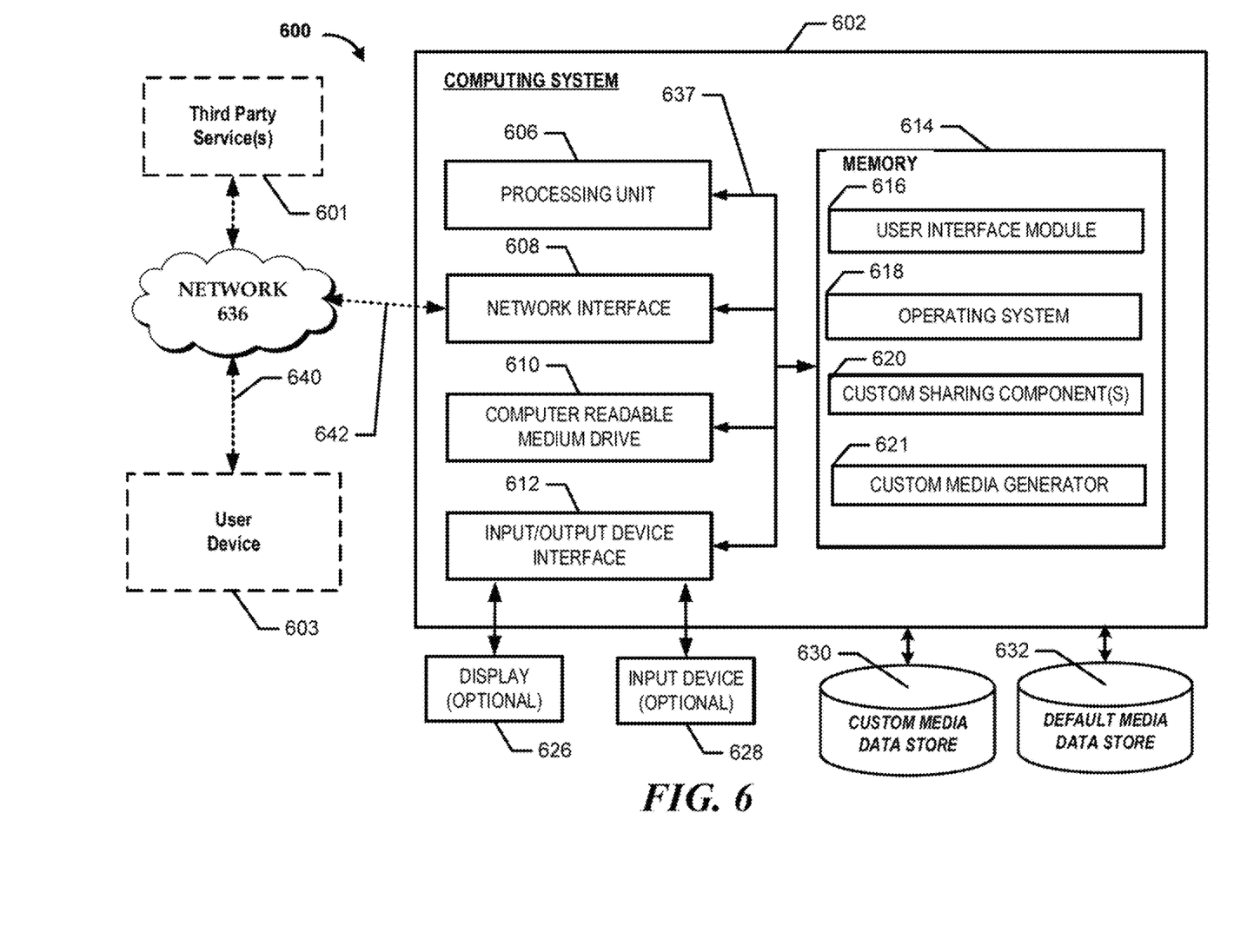
FIG. 6 is a block diagram depicting an illustrative architecture for a computing system that may implement one or more of the features described herein.

FIG. 6 illustrates a general architecture of a computing environment 600, according to some embodiments. As depicted in FIG. 6, the computing environment 600 may include a computing system 602. The general architecture of the computing system 602 may include an arrangement of computer hardware and software components used to implement aspects of the present disclosure. The computing system 602 may include many more (or fewer) elements than those shown in FIG. 6.

As illustrated, the computing system 602 includes a processing unit 606, a network interface 608, a computer readable medium drive 610, an input/output device interface 612, an optional display 626, and an optional input device 628, all of which may communicate with one another by way of a communication bus 637. The processing unit 606 may communicate to and from memory 614 and may provide output information for the optional display 626 via the input/output device interface 612. The input/output device interface 612 may also accept input from the optional input device 628, such as a keyboard, mouse, digital pen, microphone, touch screen, gesture recognition system, voice recognition system, or other input device known in the art.

The memory 614 may contain computer program instructions (grouped as modules or components in some embodiments) that the processing unit 606 may execute in order to implement one or more embodiments described herein. The memory 614 may generally include RAM, ROM and/or other persistent, auxiliary or non-transitory computer-readable media. The memory 614 may store an operating system 618 that provides computer program instructions for use by the processing unit 606 in the general administration and operation of the computing system 602. The memory 614 may further include computer program instructions and other information for implementing aspects of the present disclosure. For example, in one embodiment, the memory 614 may include a user interface module 616 that generates user interfaces (and/or instructions therefor) for display upon a computing system, e.g., via a navigation interface such as a browser or application installed on a user device 603.

In some embodiments, the memory 614 may include one or more custom sharing component(s) 620, which may be executed by the processing unit 606 to perform operations according to various embodiments described herein, such as generating a custom URI and custom rich content tag. The memory 614 may also include a custom media generator 621, which may be executed by the processing unit 606 to perform operations according to various embodiments described herein, such as generating custom image(s) based on user input. In some embodiments, the network interface 608 may provide connectivity to one or more networks or computing systems, and the processing unit 606 may receive information and instructions from other computing systems or services via one or more networks. In the example illustrated in FIG. 6, the network interface 608 may be in communication with a user device 603 via the network 636, such as the Internet. In particular, the computing system 602 may establish a communication link 642 with a network 636 (e.g., using known protocols) in order to send communications to the computing device 603 over the network 636. Similarly, the computing device 603 may send communications to the computing system 602 over the network 636 via a wired or wireless communication link 640. In some embodiments, the computing system 602 may additionally communicate via the network 636 with an optional external data source or third-party service(s) 601, which may be used by the computing system 602 to retrieve additional item data, electronic catalog data, item images, and/or other data.

Those skilled in the art will recognize that the computing system 602 and user device 603 may be any of a number of computing systems or devices including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like. The user device 603 may include similar hardware to that illustrated as being included in computing system 602, such as a display, processing unit, network interface, memory, operating system, etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   memory; and
   at least one computing device configured with computer-executable instructions that, when executed, cause the at least one computing device to:
      cause presentation of a user interface (UI) that includes information regarding an item, wherein the UI presents a share option associated with the item;
      receive an indication that a first user has selected the share option;
      in response to the indication that the first user has selected the share option, causing presentation of a customize option;
      receive an indication that the first user selected the customize option to initiate a first custom sharing instance for the item;
      in response to the indication that the first user selected the customize option:
         determine one or more customization options based at least in part on properties associated with the item; and
         cause presentation of the one or more customization options, wherein the one or more customization options allow modification to a first image, and wherein the first image depicts or represents at least a portion of the item;
      receive an indication of a user selection of a first customization option, from the one or more customization options;
      generate a first custom image associated with the first custom sharing instance for the item, wherein the first custom image is a new version of the first image that includes a modification to the first image, and wherein the modification is based at least in part on the user selection of the first customization option;
      generate a first rich content tag that is specific to the first custom sharing instance, wherein the first rich content tag includes at least (a) a first uniform resource identifier (URI) for the first custom image and (b) a second URI for a page that includes information regarding the item;
      associate the first rich content tag with a third URI that causes a requestor of the third URI to receive the first rich content tag; and
      provide the third URI to the first user for sharing the item with one or more other users in association with the first custom sharing instance, such that inclusion of the third URI in a post or message on at least one sharing or messaging service causes a device viewing the post or message to display the first custom image based on inclusion of the first URI within the first rich content tag.

2. The system of claim 1, wherein the one or more customization options include at least one of an option to (a) edit an image associated with the item, (b) select details about the item, or (c) present one of a plurality of available variations of the item.

3. The system of claim 2, wherein the share option enables the first user to select to share the item via at least one of a text message, an email message, or a social media message.

4. The system of claim 1, wherein the first rich content tag is an Open Graph Tag.

5. A system comprising:
   memory; and
   at least one computing device configured with computer-executable instructions that, when executed, cause the at least one computing device to:
      cause presentation of a user interface (UI) that includes information regarding an item, wherein the UI presents a share option associated with the item;
      in response to an indication that a first user selected a customize option to initiate a first custom sharing instance for the item:
         determine one or more customization options; and cause presentation of the one or more customization options, wherein the one or more customization options allow modification to a first image associated with the item;

receive, an indication of a user selection of a first customization option, from the one or more customization options;

generate a first custom image associated with the first custom sharing instance for the item, wherein the first custom image is a new version of the first image that includes a modification to the first image based on one or more user selections made via the UI;

generate a first rich content tag that is specific to the first custom sharing instance, wherein the first rich content tag includes a first uniform resource identifier (URI) for the first custom image;

associate the first rich content tag with a custom uniform identifier (URI) that causes a requestor of the custom URI to receive the first rich content tag; and provide the custom URI to the first user for sharing the item with one or more other users in association with the first custom sharing instance.

6. The system of claim 5, wherein the one or more customization options are based at least in part on properties associated with the item.

7. The system of claim 5, wherein the first image depicts or represents at least a portion of the item.

8. The system of claim 5, wherein the modification to the first image comprises changing a background of the image or overlaying text within the first image.

9. The system of claim 5, wherein the first rich content tag further includes at least a third URI for a page that includes information regarding the item.

10. The system of claim 9, wherein the computer-executable instructions further cause the at least one computing device to:

receive an indication that the first user selected a share selection of one or more share options to send the custom URI to a messaging service associated with a second user; and in response to the indication that the first user selected the share selection:

retrieve the custom URI; and send the custom URI to the messaging service such that the messaging service can retrieve the first custom image by locating the first URI via the custom URI, wherein upon retrieving the first custom image the messaging service is configured to display the first custom image as a selectable message that upon being selected directs a user of the messaging service to the page that includes information regarding the item.

11. The system of claim 9, wherein the computer-executable instructions further cause the at least one computing device to:

receive an indication that the first user selected a share selection of one or more share options to send the custom URI to a third-party service; and in response to the indication that the first user selected the share selection:

retrieve the custom URI; and send the custom URI to the third-party service via the share selection such that the third-party service can retrieve the first custom image by locating the first URI via the custom URI, wherein upon retrieving the first custom image the third-party service is configured to display the first custom image as a selectable social media post that upon being selected directs a user of the third-party service to the page that includes information regarding the item.

12. The system of claim 9, wherein the page that includes information regarding the item additionally displays the first custom image.

13. The system of claim 5, wherein the share option enables the first user to select to share the item via at least one of a text message, an email message, or a social media message.

14. The system of claim 5, wherein the first rich content tag is an Open Graph Tag.

15. A computer-implemented method comprising:

causing presentation of a user interface (UI) for an item, wherein the UI presents a share option associated with the item;

in response to an indication that a first user selected a customize option to initiate a first custom sharing instance for the item, causing presentation of one or more customization options, wherein the one or more customization options allow modification to at least a first image associated with the item;

receiving an indication of a user selection by the first user of a first customization option, from the one or more customization options;

generating a first custom image associated with the first custom sharing instance for the item;

generating a first rich content tag that is specific to the first custom sharing instance, wherein the first rich content tag includes a first uniform resource identifier (URI) for the first custom image;

associating the first rich content tag with a custom uniform identifier (URI); and providing the custom URI to the first user for sharing the item with one or more other users in association with the first custom sharing instance.

16. The computer-implemented method of claim 15, wherein the first custom image is a new version of the first image that includes a modification to the first image.

17. The computer-implemented method of claim 15, wherein the first rich content tag further includes at least a third URI for a page that includes information regarding the item.

18. The computer-implemented method of claim 17, further comprising:

receiving an indication that the first user selected a share selection of one or more share options to send the custom URI to a messaging service associated with a second user; and in response to the indication that the first user selected the share selection:

retrieving the custom URI; and sending the custom URI to the messaging service such that the messaging service can retrieve the first custom image by locating the first URI via the custom URI, wherein upon retrieving the first custom image the messaging service is configured to display the first custom image as a selectable message that upon being selected directs a user of the messaging service to the page that includes information regarding the item.

19. The computer-implemented method of claim 17, further comprising:

receiving an indication that the first user selected a share selection of one or more share options to send the custom URI to a third-party service; and in response to the indication that the first user selected the share selection:

retrieving the custom URI; and sending the custom URI to the third-party service via the share selection such that the third-party service can retrieve the first custom image by locating the first URI via the custom URI, wherein upon retrieving the first custom image the third-party service is configured to display the first custom image as a selectable social media post that upon being selected directs a user of the third-party service to the page that includes information regarding the item.

20. The computer-implemented method of claim 17 further comprising:

prior to providing the custom URI to the first user, causing display of the first custom image to the first user for confirmation that the first custom image should be associated with the first custom sharing instance for the item.

\* \* \* \* \*